INVENTORS
NORMAN SCHWEIZER
SAMUEL BARMHERZIG
BY
ATTORNEYS 3,494,156
ELECTROMAGNETIC LOCKING SYSTEM
Norman Schweizer, 110 S. Clinton Ave., Bayshore, N.Y. 11706, and Samuel Barmherzig, 1457 E. 86th St., Brooklyn, N.Y. 11236
Filed June 12, 1967, Ser. No. 645,162
Int. Cl. B60r 25/04; H02j 1/00
U.S. Cl. 70—241                                    4 Claims

ABSTRACT OF THE DISCLOSURE

An automobile ignition and hood security system including an ignition line having an electromagnetically operated switch under the automobile hood; a solenoid controlled lock is provided for a hood lock which in turn is operated according to the state of said switch. A partially conductive plate serves to bridge contacts in the electromagnetic control line for the switch and both the plate and the conventional ignition switch key are required to operate the car and lock and unlock its hood.

---

This invention relates to locking mechanisms and the like and more particularly locking systems especially adapted to assure the security of automobiles and which normally serve to secure and lock the automobile hood to the body of the vehicle while the latter is not being operated.

According to the present invention there is provided an electrical network associated with both the usual ignition system and a specially designed hood latch device which operate conjointly in the system to preclude operation of the car and even access to its operating components, which include an ignition switching component in addition to the normal key operated ignition switch, when the car is not being driven and the owner is absent. In general, this joint control of the ignition line having disposed in it the distributor and starter motor elements and a hood latch device is effected by providing special electromagnetic elements located under the hood for security purposes, these elements being in turn controlled according to the state of electrical contacts within the vehicle that may be bridge solely through the agency of a uniquely designed printed circuit which must correspond precisely with the physical and electrical state of the contacts that the ignition line and the hood latch devise may be operated in the desired manner.

One object of the present automobile security system is the provision of means for securing concurrently both ignition line and car hood.

Another object of the system is to provide a secure ignition switch device that must be operated independently of the normal ignition switch thus providing additional car safety.

An advantage of the system is to provide a special hood latch to afford security for both the conventional engine and associated components of the vehicle and which protects, in addition, certain critical elements essential to the operation of both the engine itself and that of the safety hood latch.

Figure 1:
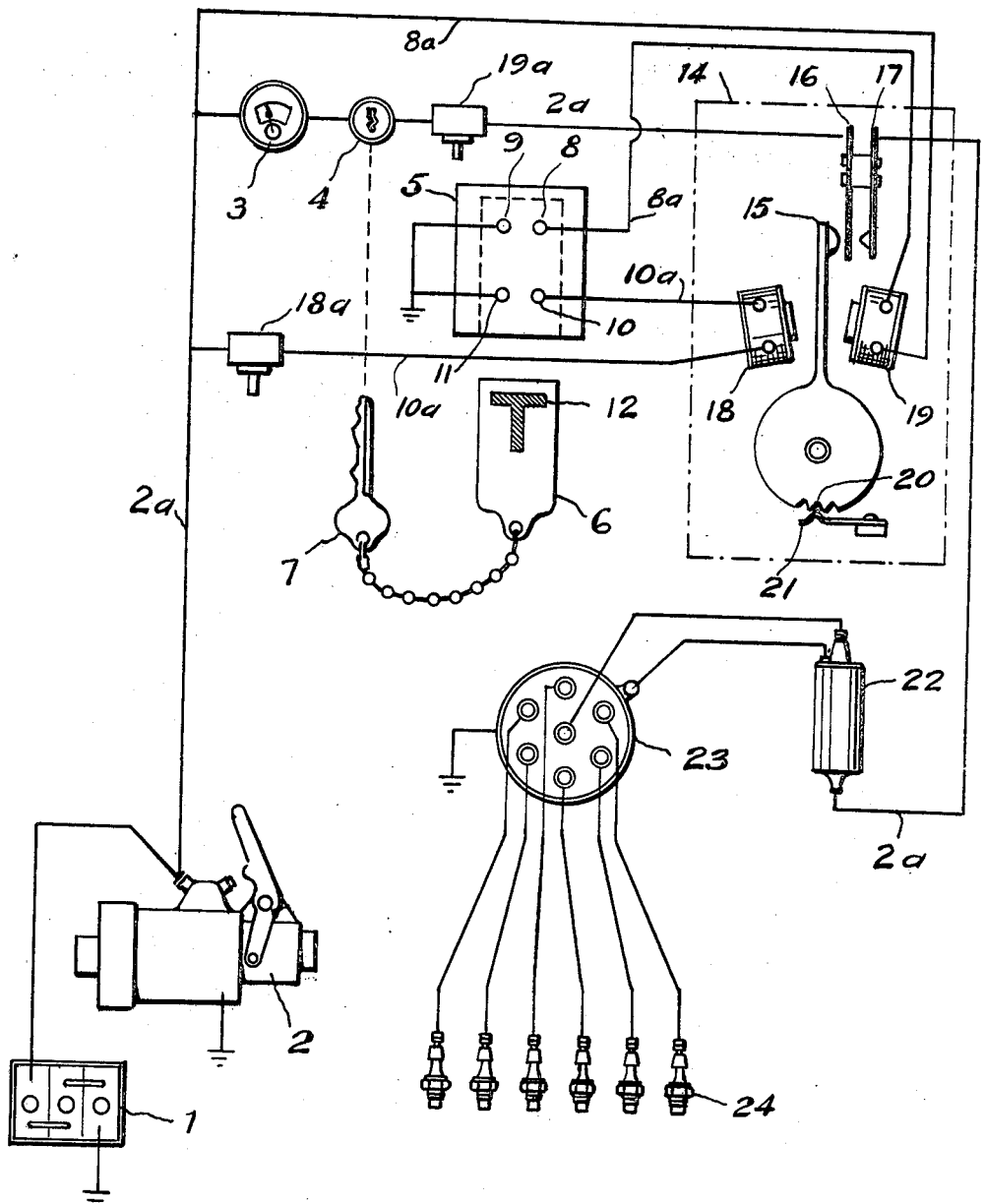
Figure 2:
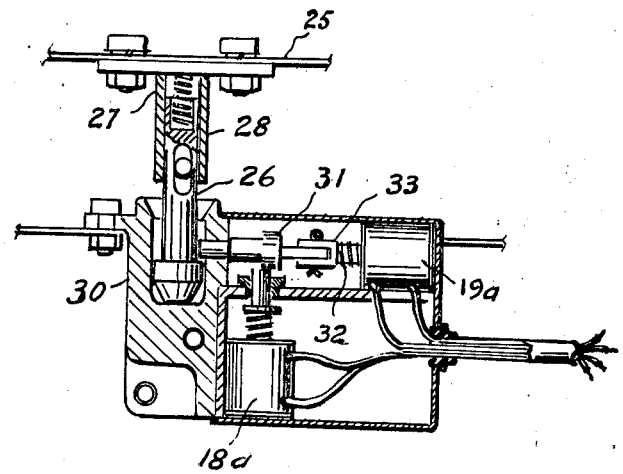

Other objects and advantages of the present system may be appreciated on reading the following description of one embodiment thereof which is taken in conjunction with the accompanying drawings, in which FIG. 1 is a diagrammatic illustration of the present automobile ignition and hood latch securing system embodying one form of embodiment of the invention;

FIG. 2 is a detail showing the principal operating components of the hood latch device;

Referring to FIG. 1, battery 1 is connected through starter motor 2 in ignition line 2a to ammeter 3 and conventional ignition switch 4.

Disposed in convenient proximity to the ignition switch 4 is double pole switch box 5 which is operated by printed circuit, key plate 6. The plate 6 is chained to ignition key 7 which is adapted to fit the automobile ignition switch 4. The switch 5 has a pair of opposing electrical contacts 8 and 9, and 10 and 11 which are critically spaced. The plate 6 is provided with a printed circuit 12 adapted to bridge the contacts in the box 5.

Disposed under the hood of the automobile is coil box 14 containing an armature 15 in control of ignition line contacts 16 and 17. The state of the armature is governed in turn by electromagnetic coil 18 in line 10a disposed between grounded contacts 10 and 11 and ignition 2d and by electromagnetic coil 19 disposed in line 8a between grounded contacts 8 and 9 and the ignition line, 2a. The armature 15v. is supported on toothed wheel 20 which is physically held in the position set by the coils 18 and 19 by means of detent 21.

The ignition line 2a is then connected to the generator 22 which supplies AC current to distributor 23 for the spark plugs 24.

As shown in FIG. 2 hood 25 supports in depending fashion hood latch bolt 26 backed by compression spring 27 within cylindrical member 28. The bolt 26 projects in a bore provided in the forward end of the automobile body and its end within the bore has a head 30 forming with the shank of the bolt a locking shoulder for member 31. Solenoid 19a in ignition line 2a controls the axial position of the member 31 which is connected to a spring biased armature 32 of the solenoid 19a by means of bifurcated connection 33. A second solenoid 18a in line 10a serves to maintain the member 31 in withdrawn or hood unlatch position and release it to its normal hood locking position in accordance with the operation of the coil 18.

In operation, it may be seen that when the ignition switch is turned on and plate 6 inserted in the switch box 5 the coils 18 and 19 are momentarily activated resulting in the closure of ignition line contacts 16 and 17. The automobile engine is thereby started and the hood is unlatched whereby access is afforded to the engine. When the engine is turned off by the ignition key 7 and the withdrawal of the printed circuit plate 6, the momentary bridging of contacts 10 and 11 causes the armature 15 to open against detent 21 due to the temporary energizing of coil 18 in line 10a. As a consequence solenoid 18a is energized to permit the locking member 31 to return to hood lock position.

Various modifications of the invention may be effected by persons skilled in the art without departing from the scope and principle thereof as defined in the appended claims.

What is claimed is:
1. A locking system comprising a housing and a closure member therefor, electrically actuated means for latching said closure member to the housing, switching means disposed within said housing and electrically connected to said latching means to actuate said latching means, a main line connected to said switching means and a power source, actuating means for said switching means, a control switch disposed outside of said housing and also connected to said main line, and second control switch means disposed outside of said housing and connected to said switch actuating means and said power source for actuating said switching means and operating said latching means, said second control device including a double pole switch and a printed circuit plate adapted to bridge the poles of said switch momentarily and sequentially, said poles connected to said switch actuating means, whereby said switch and switching means are cojointly in control of both said main line and said latching means.

2. A system as defined in claim 1 wherein said switching means disposed in the housing include a pair of contact elements, an armature adapted to close said contacts, electromagnetic devices connected between the main line and said switching means, and a detent means for holding the armature in the position set by the switching means after being momentarily closed.

3. A system as defined in claim 2 wherein said latching means includes a spring biased bolt depending from the hood of said housing, a spring biased first solenoid armature disposed within the housing and adapted to lock said bolt and a second solenoid armature similarly disposed in the housing and in control of said first solenoid armature.

4. A system as defined in claim 3 wherein said solenoid armatures are electrically connected between said electro magnetic devices and the main line.

References Cited

UNITED STATES PATENTS

| | | | |
|---|---|---|---|
| 1,856,391 | 5/1932 | Keppler | 70—241 |
| 2,940,292 | 6/1960 | Heath | 70—241 |

FOREIGN PATENTS

| | | |
|---|---|---|
| 231,645 | 4/1925 | Great Britain. |

ROBERT K. SCHAETER, Primary Examiner

D. SMITH, JR., Assistant Examiner

U.S. Cl. X.R.

307—10